United States Patent Office 3,228,341
Patented Jan. 11, 1966

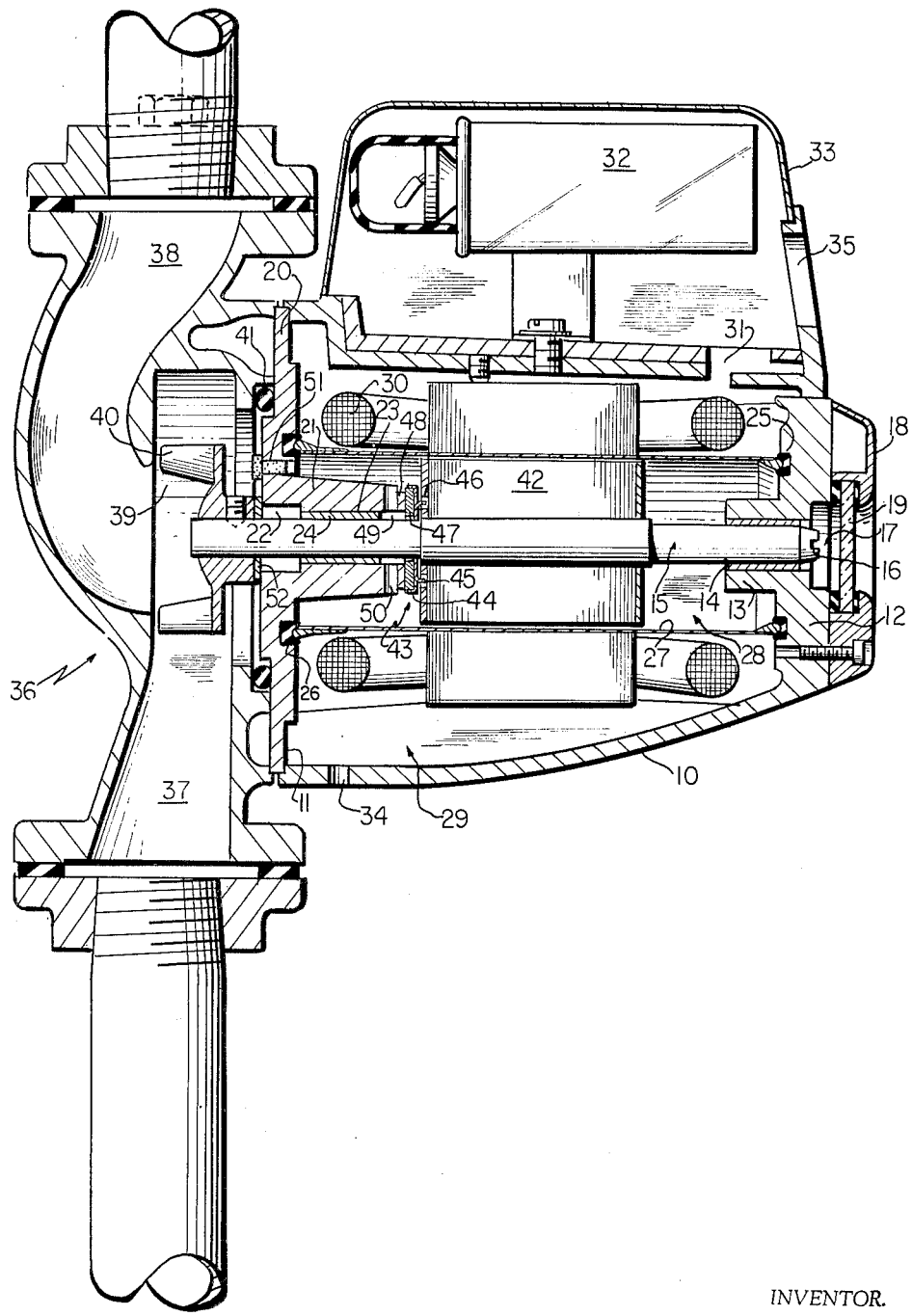
INVENTOR.
*PHILIP CLARKSON HUNGERFORD, JR.*
BY
*Robertson & Smythe*
ATTORNEYS

3,228,341
PUMP
Philip Clarkson Hungerford, Jr., Cleveland Heights, Ohio, assignor to Taco, Inc., a corporation of New York
Filed Aug. 21, 1963, Ser. No. 303,529
5 Claims. (Cl. 103—87)

This invention relates to combined liquid circulating pump and motor units, and particularly to an improved circulating pump and motor unit of the type that includes a compartment within which the rotor of the motor is arranged in liquid-tight sealing relation relative to a compartment within which the motor stator is located.

Such units permit the pumped liquid to surround the motor rotor and to maintain the bearings for the rotor shaft at all times submerged by the liquid being pumped so that said bearings are lubricated by the pumped liquid as well as cooled by said liquid.

Such units are often used in hot water heating systems where the water, due to circulation through ferrous metal pipes, becomes contaminated with ferrous metal particles in the form of iron oxide such as rust. Accordingly, the flow of this contaminated water into and out of the compartment within which the motor rotor is located deposits the contaminants on the pump bearings, thus reducing the bearing clearance and thereby inhibiting lubricant and coolant from reaching the bearing area, eventually causing bearing failure. Some of the contaminants are magnetic and when such water flows past the motor rotor, the magnetic field developed between the rotor and stator causes such particles to become attracted to the rotor, building up a coating thereon which eventually may stall the motor.

The principal object of the present invention is to provide a combined pump and motor unit of the above type in which the contaminants in the pumped liquid are inhibited from adversely affecting the pump bearings and rotor.

Another object of the invention is to provide such a combined pump and motor unit in which bearings for the rotor of the motor are submerged within a quantity of the liquid being pumped, and the contaminants in the liquid are inhibited from adversely affecting said bearings.

In one aspect of the invention, a combined pump and motor unit may comprise a somewhat cylindrical, hollow housing member with the front end open and the rear end closed, and within which, adjacent the housing walls, may be located the stator windings of an electric motor. A front end plate may be attached to the housing, and it and the closed rear end may include a resilient sealing ring on the facing sides thereof. A thin-walled tubular member may extend between the resilient sealing rings, the ends of said tubular member being rolled or enlarged to provide an adequate seal between the resilient sealing rings.

In another aspect of the invention, the rear end plate may include a rear bearing for the shaft that supports the motor armature within the tubular member. An external recess in the rear end plate may form with an end cap, a chamber that may be closed by a transparent window, and the end of the armature shaft may include a screwdriver slot that is observable through the window so that it can be visually determined whether the shaft is rotating.

In still another aspect of the invention, the front plate containing the sealing ring for the front end of the tubular member may be held in place by a casting that includes inlet and outlet passages between which is formed a chamber which receives a pump impeller fixed to the front end of the armature shaft. A sealing ring may be located between the casting and the front end plate to prevent leakage of liquid exteriorly of the unit assembly. The front plate may support a bearing in line with the bearing on the rear plate for supporting the front end of the armature shaft.

In still another aspect of the invention, a rotatable thrust bearing means may be provided between the front bearing end and the front of the armature, and radial passages may be provided in the bearing mount adjacent said rotatable thrust bearing means.

In a still further aspect of the invention, porous plug means may be provided in the front end plate, forming a restrictive passage from the pump impeller chamber to the interior of the tubular member within which the motor armature is mounted. The construction is such that the armature provides a small clearance with its surrounding tubular member, and as water or other liquid is pumped from the inlet to the outlet, some of it passes through the front armature shaft bearing, thence radially outward from said bearing through the rotatable thrust bearing means, which acts like a centrifugal pump, and radially inwardly through the radial passages in the front bearing mount. The water, of course, fills the space between the motor rotor and the tubular member surrounding the rotor and that space in which the rear bearing is located, and through it into the compartment at the rear of the unit that is closed by the transparent window.

It has been found that the provision of the rotatable thrust means between the front end of the rotor and the end of the front bearing mount, together with the radial passages, causes a recirculation of the liquid in the vicinity of the thrust means. This is due to the liquid being centrifugally forced radially outwardly between the relatively rotatable elements of the thrust bearing, and its return through the radial passages in the bearing mount. It has been found that such action reduces to a minimum the circulation of the contaminants in the liquid through the space surrounding the rotor and thereby inhibits the formation of metallic oxide coatings on the rotor due to magnetic impurities in the liquid being pumped. Additionally, in the absence of the radial passages, the centrifugal action builds up a pressure within the pump adjacent the bearing mount, which when the pump stops, forces the contaminated water back through the bearing, doubling the tendency toward buildup of contaminants on the bearing surfaces.

The above, other objects and novel features of the invention will become apparent from the following specification and accompanying drawing which are merely exemplary.

In the drawing:

The figure is a sectional view through a combined pump and motor unit to which the principles of the invention have been applied.

Referring to the drawing, the principles of the invention are shown as applied to a combined pump and motor unit including a housing 10 that is shown as somewhat of a hollow cylindrical construction having an open front end 11 and a closed rear end or end plate 12. The closed rear end 12 may be provided with a bored bearing boss 13 supporting a bearing bushing 14 that journals the rear end of a shaft 15. The rearmost end of shaft 15 is provided with a screwdriver slot 16, and said end protrudes into a chamber 17 closed by a cap 18 having a transparent window 19 therein, all for a purpose to be described later.

The open front end 11 of housing 10 may be closed by a front plate 20, and it may include a bearing mount 21 having a bore 22 and a counterbore 23. A bearing bushing 24 may be mounted within bore 22, and it may journal the front end of shaft 15. The rear end 12 and the front plate 20 may support, on their facing sides, separate resilient sealing rings 25 and 26. A rigid tubular member 27 having its ends enlarged or rolled may seat between rings 25 and 26 forming a liquid-tight seal between an inner compartment 28 and an outer concentric compartment 29. Stator windings 30 may be mounted within compartment 29, and its connections may pass through an opening 31 in housing 10 leading to a capacitor 32 within a subhousing 33 on one side of housing 10. Several holes 34 are provided in housing 10 permitting air to circulate over the stator windings 30.

The front plate 20 may be held in place against the front of housing 10 and tubular member 27 in sealing relation with rings 25, 26 by a casting 36. Bolts (not shown) may pass through casting 36 into threaded holes in housing 10. The casting 36 may include an inlet 37 and an outlet 38 between which may be a chamber 39 within which a pump impeller 40 is located, and which impeller is fixed to the front end of shaft 15. A resilient sealing ring 41 may be provided between the casting 36 and plate 20 to prevent leakage of liquid from chamber 39 to the exterior of the unit.

Shaft 15 has fixed thereto a rotor 42 for the motor, the periphery of the rotor being only slightly spaced from the inner periphery of tubular member 27. A thrust bearing 43 may be provided between the forward end of rotor 42 and the rear end of front bearing mount 21. It may comprise a metallic cage element 44 having prongs 45 that are received within recesses 46 on the front end of rotor 42 so as to rotate the cage with the rotor 42. Cage 44 supports a graphite disk 47 or other antifriction means that contacts the rear end 48 of bearing mount 21. The bearing sleeve 24 does not extend to the rear end of bearing mount 21, thus forming a collecting chamber 49 between the rear end of sleeve 24 and disk 47. Radial passages 50 extend from chamber 49 through bearing mount 21 to the space between the latter and the inner surface of tubular member 27.

One or more porous plugs 51 may be mounted in through passage means in the front plate 20. Also, a thrust bearing 52 may be located between impeller 40 and plate 20. Bearing 52 may be of such construction as to permit passage of the liquid being pumped to the counterbore 23, from whence it works back along shaft bushing 24 to chamber 49. The action of thrust bearing 47 rotating against the end 48 produces a centrifugal pumping action forcing the liquid radially outwardly, and the radial passages 50 in the stationary mount 21 permit return of said liquid to chamber 49, thereby providing a circulation of the liquid in this area. The liquid, of course, passes through the space between rotor 42 and member 27, thence along shaft 15 and bushing 14 to chamber 17, thus adequately lubricating and cooling both bearing bushings 14 and 24.

It has been found that the provision of the thrust bearing 43 and the radial passages 50 provides a circulation of the pumped liquid from chamber 49 through radial thrust bearing 43 and back through radial passages 50 to chamber 49. It has also been found that without the passages 50, a pressure is built up in chamber 28 which, when the pump stops, forces the contaminated water back between bearing bushing 24 and shaft 15, thereby doubling the tendency to deposit contaminants on the bearing surfaces. Such construction also maintains the contaminated water between the rotor 42 and the inner periphery of tubular member 27 in a state of relative quiescence so that no substantial buildup of magnetic contaminants occurs on the periphery of the rotor 42.

Although the various features of the improved pump and motor unit have been shown and described in detail to fully disclose one embodiment of the invention, it will be evident that changes may be made in such details and certain features may be used without others without departing from the principles of the invention.

What is claimed is:

1. In a combined pump and motor unit, a housing having a first end plate and a second end plate; a chamber in said housing; a motor stator winding in said chamber; a shaft; a motor rotor fixed to said shaft within said chamber; bearing mounts in said first and second end plates; bearings within said mounts through which said shaft extends; an impeller connected to one end of said shaft; a pump casing having an inlet and an outlet fixed to said housing, said casing including an impeller chamber into which said impeller extends; means facilitating the passage of liquid from said impeller chamber to one of said bearings, past said rotor to said other bearing to lubricate and maintain said bearings cool; passage means extending through one of said bearing mounts; and thrust bearing means between said rotor and said one of said bearing mounts for centrifugally pumping said liquid in a recirculating manner through said passage means and said thrust bearing means whereby the liquid surrounding said rotor will be maintained in a state of relative quiescence to thereby reduce to a minimum the deposit on said rotor of magnetizable foreign matter within said liquid.

2. In a combined pump and motor unit, a housing having a back end plate and a front end plate; a tubular element extending between said plates, forming liquid seals therewith, and dividing said housing into concentric chambers; a motor stator winding in the outer of said concentric chambers; a shaft; a motor rotor fixed to said shaft within the inner of said concentric chambers; bearing mounts in said front and back end plates; bearings within said mounts through which said shaft extends; an impeller connected to one end of said shaft; a pump casing having an inlet and an outlet fixed to said housing, said casing including an impeller chamber into which said impeller extends; means facilitating the passage of liquid from said impeller chamber through said front bearing, past said rotor to said rear bearing to lubricate and maintain said bearings cool; radial passage means extending through the front plate bearing mount; and thrust bearing means between said rotor and said front plate bearing mount for centrifugally pumping said liquid in a recirculating manner through said thrust bearing means and said radial passage means, whereby the liquid surrounding said rotor will be maintained in a state of relative quiescence to thereby reduce to a minimum the deposit on said rotor of magnetizable foreign matter within said liquid.

3. In a combined pump and motor unit, a housing having a back end plate and a front end plate; a tubular element extending between said plates, forming liquid seals therewith, and dividing said housing into concentric chambers; a motor stator winding in the outer of said concentric chambers; a shaft; a motor rotor fixed to said shaft within the inner of said concentric chambers; bearing mounts in said front and back end plates; bearings within said mounts through which said shaft extends; an impeller connected to one end of said shaft; a pump casing having an inlet and an outlet fixed to said housing, said casing including an impeller chamber into which said impeller extends; means facilitating the passage of liquid from said impeller chamber through said front bearing, past said rotor to said rear bearing to lubricate and maintain said bearings cool; radial passage means extending through the front plate bearing mount; and thrust bearing means between said rotor and said front plate bearing mount for centrifugally pumping said liquid in a recirculating manner through said thrust bearing means and said radial passage means, whereby the deposit of contaminants in said liquid on the bearing surfaces of said front bearing is reduced to a minimum and the liquid surrounding said rotor is inhibited from rapid circulation to thereby reduce to a minimum the deposit on said rotor of magnetizable foreign matter within said liquid.

4. In a combined pump and motor unit, a housing having a back end plate and a front end plate; a tubular element extending between said plates, forming liquid seals therewith, and dividing said housing into concentric chambers; a motor stator winding in the outer of said concentric chambers; shaft; a motor rotor fixed to said shaft within the inner of said concentric chambers; bearing mounts in said front and back end plates; bearings within said mounts through which said shaft extends; an impeller connected to one end of said shaft; a pump casing having an inlet and an outlet fixed to said housing, said casing including an impeller chamber into which said impeller extends; means facilitating the passage of liquid from said impeller chamber through said front bearing, past said rotor to said rear bearing to lubricate and maintain said bearings cool; radial passage means extending through the front plate bearing mount; and thrust bearing means between said rotor and said front plate bearing mount for centrifugally pumping said liquid in a recirculating manner through said thrust bearing means and said radial passage means, whereby the liquid surrounding said rotor will be inhibited from rapid circulation to thereby reduce to a minimum the deposit on said rotor of magnetizable foreign matter within said liquid, said thrust bearing means being connected to said rotor for rotation therewith.

5. In a combined pump and motor unit, a housing having a back end plate and a front end plate; a tubular element extending between said plates, forming liquid seals therewith, and dividing said housing into concentric chambers; a motor stator winding in the outer of said concentric chambers; a shaft; a motor rotor fixed to said shaft within the inner of said concentric chambers; bearing mounts in said front and back end plates; bearings within said mounts through which said shaft extends; an impeller connected to one end of said shaft; a pump casing having an inlet and an outlet fixed to said housing, said casing including an impeller chamber into which said impeller extends; means facilitating the passage of liquid from said impeller chamber through said front bearing, past said rotor to said rear bearing to lubricate and maintain said bearings cool; radial passage means extending through the front plate bearing mount; thrust bearing means between said rotor and said front plate bearing mount for centrifugally pumping said liquid in a recirculating manner through said thrust bearing means and said radial passage means, whereby the liquid surrounding said rotor will be inhibited from rapid circulation to thereby reduce to a minimum the deposit on said rotor of magnetizable foreign matter within said liquid, said thrust bearing means being connected to said rotor for rotation therewith; and porous plug means in said front plate means extending between the impeller chamber to the interior of said tubular element.

References Cited by the Examiner
UNITED STATES PATENTS

| | | | |
|---|---|---|---|
| 2,517,233 | 8/1950 | Peters | 103—87 |
| 2,713,311 | 7/1955 | White | 103—87 |
| 2,762,311 | 9/1956 | Litzenberg | 103—87 |
| 2,871,791 | 2/1959 | Litzenberg | 103—87 |
| 2,942,555 | 6/1960 | Pezzillo | 103—87 |

DONLEY J. STOCKING, *Primary Examiner.*

ROBERT M. WALKER, *Examiner.*